(12) United States Patent
Feng

(10) Patent No.: US 11,532,247 B2
(45) Date of Patent: Dec. 20, 2022

(54) FLEXIBLE DISPLAY DEVICE

(71) Applicant: Wuhan China Star Optoelectronics Semiconductor Display Technology Co., Ltd., Wuhan (CN)

(72) Inventor: Zikang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 213 days.

(21) Appl. No.: 16/954,595

(22) PCT Filed: Dec. 25, 2019

(86) PCT No.: PCT/CN2019/128235
§ 371 (c)(1),
(2) Date: Jun. 17, 2020

(87) PCT Pub. No.: WO2021/012605
PCT Pub. Date: Jan. 28, 2021

(65) Prior Publication Data
US 2022/0130287 A1    Apr. 28, 2022

(30) Foreign Application Priority Data

Jul. 25, 2019    (CN) .......................... 201910676772.X

(51) Int. Cl.
*G09F 9/30* (2006.01)
*H01L 27/32* (2006.01)

(52) U.S. Cl.
CPC .......... *G09F 9/301* (2013.01); *H01L 27/3241* (2013.01)

(58) Field of Classification Search
CPC ......... G06F 1/1652; G06F 2203/04102; G06F 1/1615; G06F 1/1624; H04M 1/0268
See application file for complete search history.

(56) References Cited

U.S. PATENT DOCUMENTS

| 2016/0034000 | A1 | 2/2016 | Lee et al. |
| 2017/0031387 | A1* | 2/2017 | Kim .................. G06F 1/1652 |
| 2017/0060183 | A1 | 3/2017 | Zhang et al. |
| 2018/0077808 | A1* | 3/2018 | Seo .................... G06F 3/044 |
| 2018/0103550 | A1* | 4/2018 | Seo .................... H01F 7/0205 |
| 2018/0188778 | A1* | 7/2018 | Shin .................. G06F 1/1624 |

FOREIGN PATENT DOCUMENTS

| CN | 104461127 | 3/2015 |
| CN | 106847103 | 6/2017 |
| CN | 109196448 | 1/2019 |
| CN | 110246422 | 9/2019 |

* cited by examiner

*Primary Examiner* — Yuzhen Shen
(74) *Attorney, Agent, or Firm* — PV IP PC; Wei Te Chung; Ude Lu

(57) ABSTRACT

The disclosure provides a flexible display device using a flexible display panel equipped with a movable case assembly. The moving case assembly can move and drive the flexible display panel to form a display device with adjustable panel dimensions. When two cases constituting the case assembly slide relatively, a dimension of a front display area of the flexible display device change. Displacement of the sliding flexible display device may compensate the dimensional change of the flexible display panel on a surface of the flexible display device.

15 Claims, 13 Drawing Sheets a1 a2

FLEXIBLE DISPLAY DEVICE

RELATED APPLICATIONS

This application is a National Phase of PCT Patent Application No. PCT/CN2019/128235 having International filing date of Dec. 25, 2019, which claims the benefit of priority of Chinese Patent Application No. 201910676772.X filed on Jul. 25, 2019. The contents of the above applications are all incorporated by reference as if fully set forth herein in their entirety.

FIELD AND BACKGROUND OF THE INVENTION

This application relates to the technical field of display technology, and in particular, to a flexible display device.

Flexible organic light emitting diodes (OLEDs) have been increasingly attracted wide attention for the bendability and pliability characteristics. The space occupied by a large screen can be reduced with an OLED made portable through folding or rolling up. Thus, the main research direction of flexible OLED has been directed to foldable and scrollable display devices. Traditional flexible display devices with bending radius limitations have encountered difficulties in the progress of thinner, portable, and form diversity design. In some traditional structures use winding or folding of a flexible panel can cause stress damage to the flexible panel.

Hence, current technologies are flawed, and improvement is desired.

SUMMARY OF THE INVENTION

This application provides a flexible display device to address the problems of traditional flexible display devices, including large space occupation, less portability, structural complexity, and vulnerability of a display panel to stress damage when wrapped by an elastic structure.

To address the problems, the invention provides solutions as detailed in the following.

The disclosure provides a flexible display device comprising:

a first case and a second case which are located correspondingly, wherein the first case and the second case cooperatively form a case assembly for containing a flexible display panel, a container cavity is formed between the first case and the second case, and the first case and the second case are configured to form an open channel on a side surface of the case assembly, wherein the first case and the second case are respectively configured to form a mutually complementary first compensation structure and second compensation structure corresponding to another side surface of the case assembly, and the first compensation structure of the first case and the second compensation structure of the second case complementarily fill gaps of each other to allow relative movement of the first case and the second case; and a pivoted assembly located on two sides of the first case, wherein the flexible display panel extends from one end of the open channel which is away from the pivoted assembly around a surface of the case assembly and the pivoted assembly, and enters into the container cavity through anther end of the open channel;

wherein the flexible display panel further comprises an extended part located in the container cavity, moving of the second case relative to the first case drives a change in length of the flexible display device in a moving direction of the second case, the pivoted assembly drives the flexible display panel to move to compensate the change in length of the flexible display device in the moving direction of the second case, and the change in length of the flexible display device in the moving direction of the second case is equal to a change in length of extended part through the open channel.

In the disclosed flexible display device, both of the first compensation structure and the second compensation structure are tooth shaped with a same tooth pitch and interlaced to fill the gaps of each other.

In the disclosed flexible display device, the pivoted assembly comprises a first wheel and a second wheel which have an axial direction perpendicular to a moving direction of the first case and the second case, the first wheel is located on an end of the first case away from the second case, the second wheel is located on an end of the first case close to the second case, a diameter of the first wheel is less than or equal to thickness of the case assembly, and a diameter of the second wheel is less than the diameter of the first wheel.

In the disclosed flexible display device, the first case comprises a first case main body and the first compensation structure, an end of the first compensation structure away from the second case is connected with the first case main body, and a gap is formed between a remaining portion of the first compensation structure and the first case main body.

The second case comprises a second case main body and the second compensation structure, an end of the second compensation structure away from the first case is connected with the second case main body, and a gap is formed between the first case main body and a remaining portion of the second compensation structure, and the second wheel is located between the second case main body and the first case main body.

In the disclosed flexible display device, a portion of the first wheel is embedded into an end of the first case main body, a remaining portion of the first wheel is exposed on a surface of the first case main body in contact with the flexible display panel, a portion of the second wheel is embedded into another end of the first case main body, a remaining portion of the second wheel is exposed on the surface of the first case main body in contact with the flexible display panel.

In the disclosed flexible display device, the container cavity is formed from the gap formed between the first compensation structure and the first case main body, the gap formed between the second compensation structure and the first case main body, and the gap formed between the second wheel and the second case main body, an end of the flexible display panel having the extended part is affixed to an end of the second compensation structure closing to first wheel through a first fit position, another end of the flexible display panel is affixed to a side surface of the second case main body, which is away from the second wheel, through a second fit position.

In the disclosed flexible display device, thickness of the second compensation structure is greater than thickness of the first compensation structure.

In the disclosed flexible display device, when the second case moves away from the first case in a moving direction, a length of the flexible display device increases in the moving direction, the second case pulls the flexible display panel via the second fit position and drives pivoted assembly to rotate and to pull the extended part of the flexible display panel from the container cavity to an outer surface of the case assembly.

In the disclosed flexible display device, when the second case moves toward the first case in a returning direction, the length of the flexible display device decreases in the returning direction, the second case pulls the flexible display panel via the first fit position and drives pivoted assembly to rotate and to pull the extended part of the flexible display panel back into the container cavity from the outer surface of the case assembly.

In the disclosed flexible display device, a portion of the extended part which is not belonging to a portion of extended part corresponding to the first fit position is in contact with the case assembly.

In the disclosed flexible display device, the flexible display device has a latch which is open when the second case moves relative to the first case, and is close after the second case moves relative to the first case for a predetermined distance.

In the disclosed flexible display device, a supporting layer is located on a side surface of the flexible display panel which is in contact with the pivoted assembly.

In the disclosed flexible display device, the moving direction in which the second case moves relative to the first case is a direction in which the first compensation structure and the second compensation structure extend.

In the disclosed flexible display device, the first compensation structure and the second compensation structure have limiting stoppers for limiting a moving range of the second case relative to the first case.

In the disclosed flexible display device, width of the open channel is greater than or equal to thickness of the flexible display panel, and is increased when the second case moves away from the first case, and decreased when the second case moves toward the first case.

The beneficial effects of the invention are:

The invention provides a flexible display device using a flexible display panel equipped with a movable case assembly. The case assembly can move and drive the flexible display panel to form a display device with adjustable panel dimensions. The flexible display device provides display functions on both a front side and a back side. Relative movement between two cases can change the front side and the back side dimensions of the panel and entire volume of the flexible display device, and make the flexible display device transform among states of a small display size, a middle display size, and a large display size. Additionally, an outer surface of the flexible display device is complementary to the panel dimension change in an inner container cavity via case sliding, which can prevent the flexible display panel from being pulled and damaged by the flexible display device during dimensional change of the front display panel.

BRIEF DESCRIPTION OF THE SEVERAL VIEWS OF THE DRAWINGS

To clear disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DESCRIPTION OF SPECIFIC EMBODIMENTS OF THE INVENTION

Figure 1:
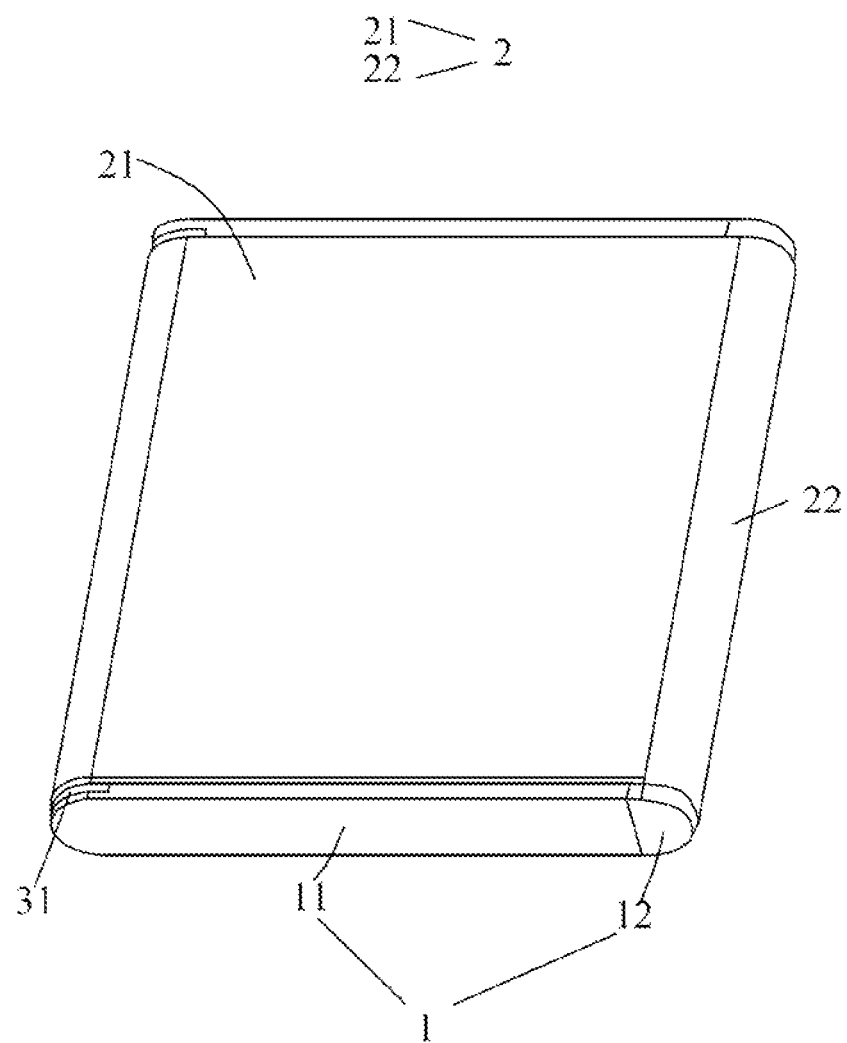
FIG. 1 is a schematic diagram showing a front view of a flexible display device in a small display dimension state according to an embodiment of the invention.

The description of embodiments in the following is to illustrate specific embodiments of the present invention with reference to the accompany drawings. The directional terms mentioned in the present invention, such as "upper", "lower", "before", "after", "left", "right", "inside", "outside", and "side" just refer to directions in the drawings. Therefore, the directional terminology is used for the purpose of illustration and understanding of the invention, and not used for limiting the invention. In the drawings, a similarly structured units are represented by the same label.

Figure 2:
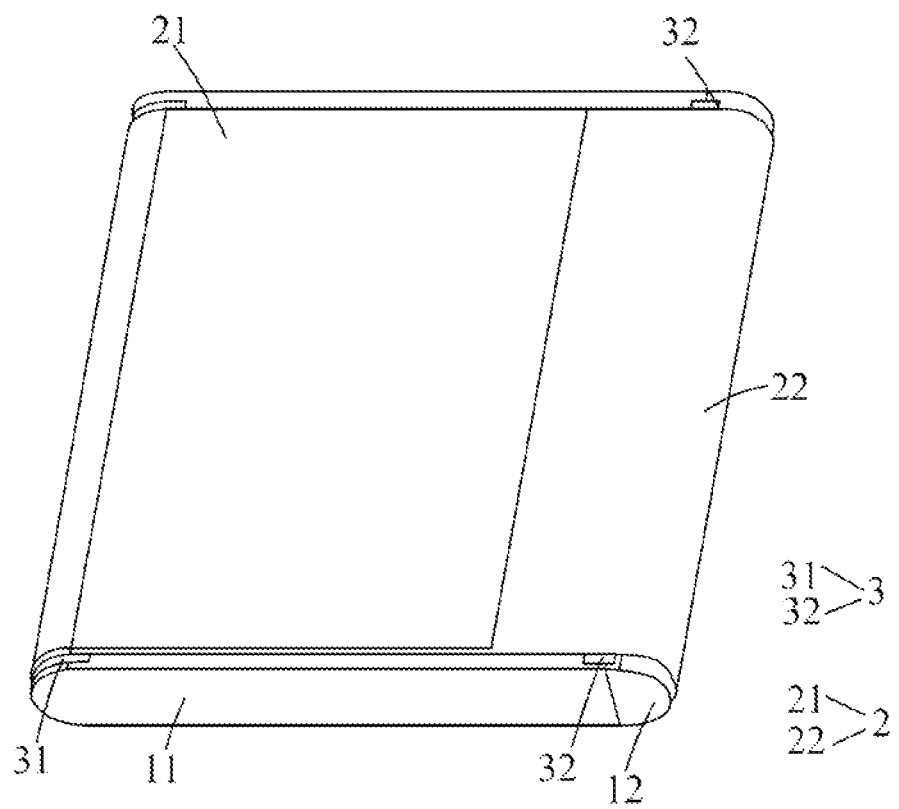
FIG. 2 is a schematic diagram showing a rear view of the flexible display device in the small display dimension state according to an embodiment of the invention.

FIG. 1 and FIG. 2 are respectively schematic diagrams showing front and back views of a flexible display device in a small display dimension state according to an embodiment of the invention. The flexible display device includes a first case 11 and a second case 12 which are located correspondingly. The first case 11 and the second case 12 can move relatively to each other and cooperatively form a case assembly 1 for containing a flexible display panel 2. A pivoted assembly 3 is located on two sides of the first case 11. The pivoted assembly 3 is in contact with the flexible display panel 2 and can rotate and drive the flexible display panel 2 to move. The pivoted assembly 3 comprises a first wheel 31 and a second wheel 32 which have an axial direction perpendicular to a moving direction of the first case 11 and the second case 12. The flexible display panel 2 extends from an end of case assembly 1, passes through an upper surface of the case assembly 1 and the first wheel 31, and enter into the case assembly 1 from a lower surface of the case assembly 1 through the second wheel 32.

The flexible display panel 2 include a display area 21 and a non-display area 22. The display area 21 of the flexible display panel 2 extends from a front side to a back side of the flexible display device. Thus, the flexible display device of the disclosure has the front side and the back side for display.

Figure 3:
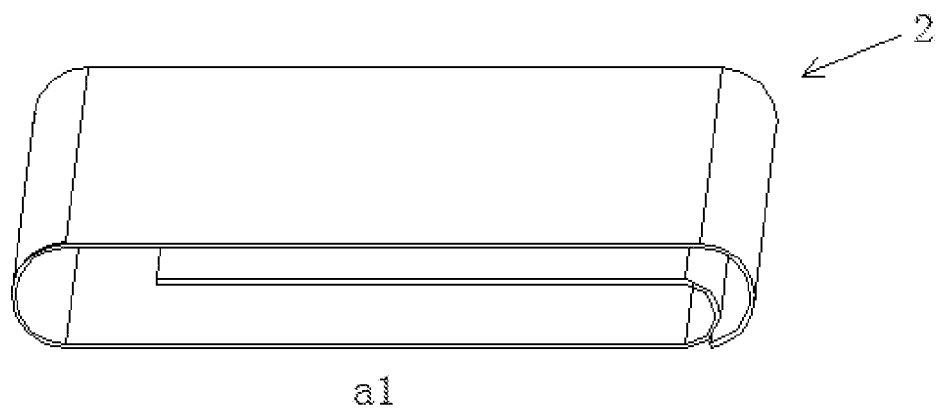
FIG. 3 is an exploded structural view showing the flexible display device in the small display dimension state according to an embodiment of the invention.
Figure 3:
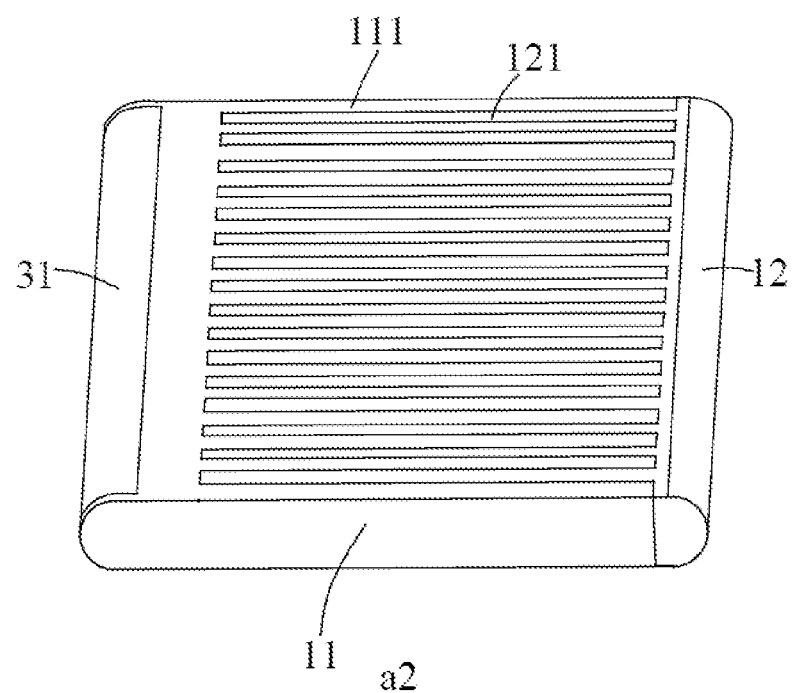

FIG. 3 is an exploded structural view showing the flexible display device in the small display dimension state according to an embodiment of the invention. Graphics a1 and a2 are respectively exploded views of the flexible display panel 2, case assembly 1, and the pivoted assembly 3. The case assembly 1 and the pivoted assembly 3 are enclosed by the flexible display panel 2. The first case 11 and the second case 12 are respectively configured to form mutually complementary a first compensation structure 111 and a second compensation structure 121 on an upper surface of the case assembly 1. The first compensation structure 111 analogous to the second compensation structure 121 has partially hollowed gaps on an upper surface of first case 11. The first compensation structure 111 of the first case 11 and the second compensation structure 121 of the second case 12 complementarily fill gaps of each other to allow relative movement of the first case 11 and the second case 12.

In the embodiment, both of the first compensation structure 111 and the second compensation structure 121 are tooth shaped, as combs shown in the figures, with a same tooth pitch. The first compensation structure 111 and the second compensation structure 121 are interlaced such that relative movement of the first case 11 and the second case 12 can fill the gaps between teeth.

In an embodiment, the tooth pitch may be less than 2 millimeter (mm) to make the tooth shaped structure dense enough to support the flexible display panel 2.

In an embodiment, a supporting layer with good stiffness, such as a steel sheet with thickness less than 30 micrometers, not shown in the figures is located on a side surface of the flexible display panel 2 which is in contact with the pivoted assembly 3, thus to eliminate uneven touch feelings on the upper surface of the flexible display panel 2 caused by the gaps of the tooth shaped structure. The gaps of the tooth shaped supporting structure can thus be hardly felt by a touching hand.

Width of each tooth of the first compensation structure 111 and the second compensation structure 121 is less than or equal to the tooth pitch, and length of each tooth of the first compensation structure 111 and the second compensation structure 121 is kept consistently the same. Tooth width and length of the first compensation structure 111 and the second compensation structure 121 may depend on dimension and real manufacturing process of the flexible display device, and not explicitly defined here.

In an embodiment, interference fit between the first compensation structure 111 and the second compensation structure 121 are formed to allow arbitrary move and stop of the first case 11 and the second case 12 along the moving direction without requiring other structures.

Figure 4:
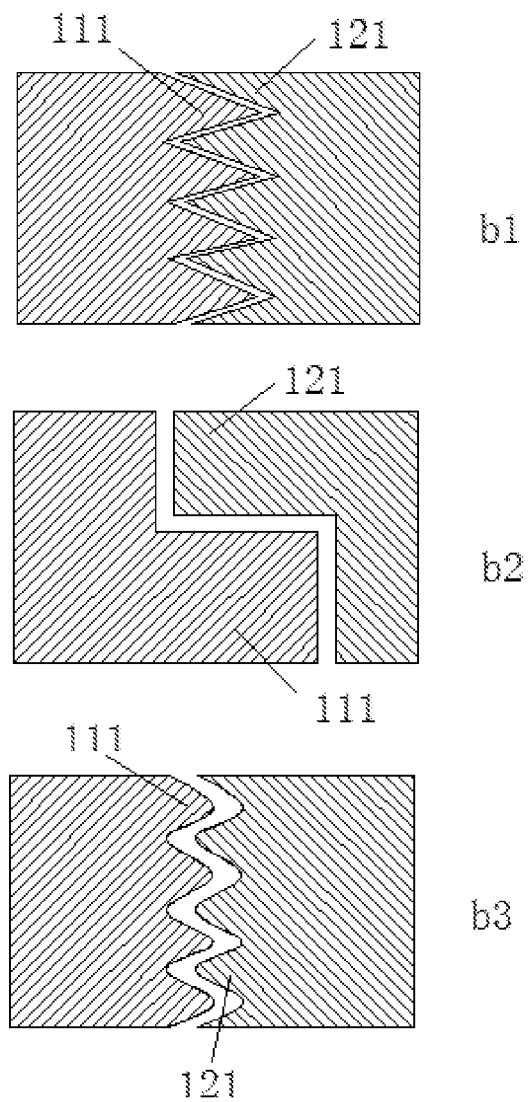
FIG. 4 is a schematic diagram showing a first compensation structure and a second compensation structure according to an alternative embodiment of the invention.

In alternative embodiments, the first compensation structure 111 and the second compensation structure 121 may include but not limited to tooth shaped structures, rectangular structures, and arc shaped structures. As shown in FIG. 4, in examples b1-b3, the first compensation structure 111 and the second compensation structure 121 complementarily fill gaps of each other to allow relative movement of the first case 11 and the second case 12.

When the flexible display device is in a small display dimension state, the gaps between the first compensation structure 111 and the second compensation structure 121 are completely filled. That is, tooth tips of the first compensation structure 111 reaches the second case 12, and so does the second compensation structure 121. Then the dimension of the flexible display device is minimized. The first compensation structure 111 and the second compensation structure 121 form a flat plane on the upper surface of the case assembly 1 to obtain flatness of the flexible display panel 2.

Figure 5:
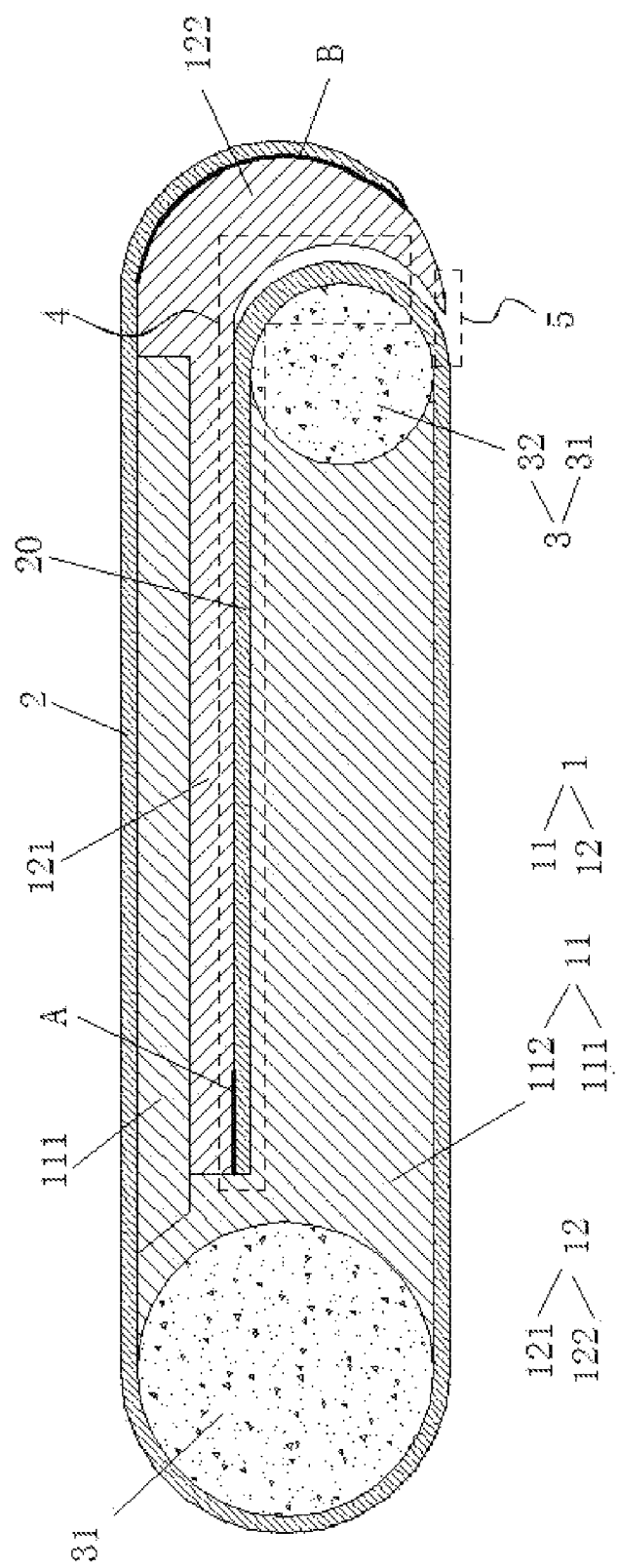
FIG. 5 is a cross sectional view showing the flexible display device in the small display dimension state according to an embodiment of the invention.

FIG. 5 is a cross sectional view showing the flexible display device in the small display dimension state according to an embodiment of the invention. The first wheel 31 is located on an end of the first case 11 away from the second case 12. The second wheel 32 is located on an end of the first case 11 close to the second case 12. A diameter of the first wheel 31 is less than or equal to thickness of the case assembly 1, and a diameter of the second wheel 32 is less than the diameter of the first wheel 31.

A container cavity 4 is formed between the first case 11 and the second case 12. The first case 11 and the second case 12 are configured to form an open channel 5 on a lower surface of the case assembly 1. The flexible display panel 2 extends from one end of the open channel 5 which is away from the second wheel 32, passes around an upper surface of the case assembly 1, the first wheel 31, and a lower surface of the case assembly 1, and enters into the container cavity 4 through anther end of the open channel 5

The flexible display panel 2 further comprises an extended part 20 located in the container cavity 4. The whole or part of the extended part 20 may have display functionality or not, and is not explicitly defined here. The embodiment is detailed using the extended part 20 without display functionality as an example.

The first case 11 comprises a first case main body 112 and the first compensation structure 111. An end of the first compensation structure 111 away from the second case 12 is connected with the first case main body 112. A gap is formed between a remaining portion of the first compensation structure 111 and the first case main body 112. The second case 12 comprises a second case main body 122 and the second compensation structure 121. An end of the second compensation structure 121 away from the first case 11 is connected with the second case main body 122. A gap is formed between the first case main body 112 and a remaining portion of the second compensation structure 121. The second wheel 32 is located between the second case main body 122 and the first case main body 112.

A portion of the first wheel 31 is embedded into an end of the first case main body 112, and a remaining portion of the first wheel 31 is exposed on a surface of the first case main body 112 in contact with the flexible display panel 2. A portion of the second wheel 32 is embedded into another end of the first case main body 112, and a remaining portion of the second wheel 32 is exposed on the surface of the first case main body 112 in contact with the flexible display panel 2.

In particular, to ensure that the pivoted assembly 3 can workably drive the flexible display panel 2, the diameter of the first wheel 31 may equal to thickness of the case assembly 1, and a half portion of the first wheel 31 is exposed on a surface of the first case main body 112 to form a maximized area in contact with the flexible display panel 2. Similar to the design of the first wheel, a sectional half of the second wheel is exposed on a surface of the first case main body 112 to form a maximized area in contact with the flexible display panel 2.

Additionally, in the embodiment, one side surface of the second case main body 122 close to the second wheel 32 is a curved surface and matches a curved surface of the second wheel 32 to further reduce the dimension of the flexible display device, but is not limited to so. The other side surface of the second case main body 122 away from the second wheel 32 may be a curved surface or a planar surface, and is not explicitly defined here.

The container cavity 4 is formed from the gap formed between the first compensation structure 111 and the first case main body 112, the gap formed between the second compensation structure 121 and the first case main body 112, and the gap formed between the second wheel 32 and the second case main body 122.

An end of the flexible display panel 2 having the extended part 20 is affixed to an end of the second compensation structure 121 closing to first wheel 31 through a first fit position A. Another end of the flexible display panel 2 is affixed to a side surface of the second case main body 122, which is away from the second wheel 32, through a second fit position B. Specifically, a portion of the extended part 20 which is not belonging to a portion of extended part 20 corresponding to the first fit position A is in contact with but not affixed to the case assembly 1.

In the embodiment, thickness of the second compensation structure 121 is greater than thickness of the first compensation structure 111. In one aspect, affixing the flexible display panel 2 to the second compensation structure 121 does not faultily cause affixing the flexible display panel 2 to first compensation structure 111, which can prevent relative movement of the first case 11 and the second case 12 from tearing the flexible display panel 2. In another aspect, during relative movement of the first case 11 and the second case 12, the flexible display panel 2 can be prevented from surface rubbing caused by the first compensation structure 111.

Figure 6:
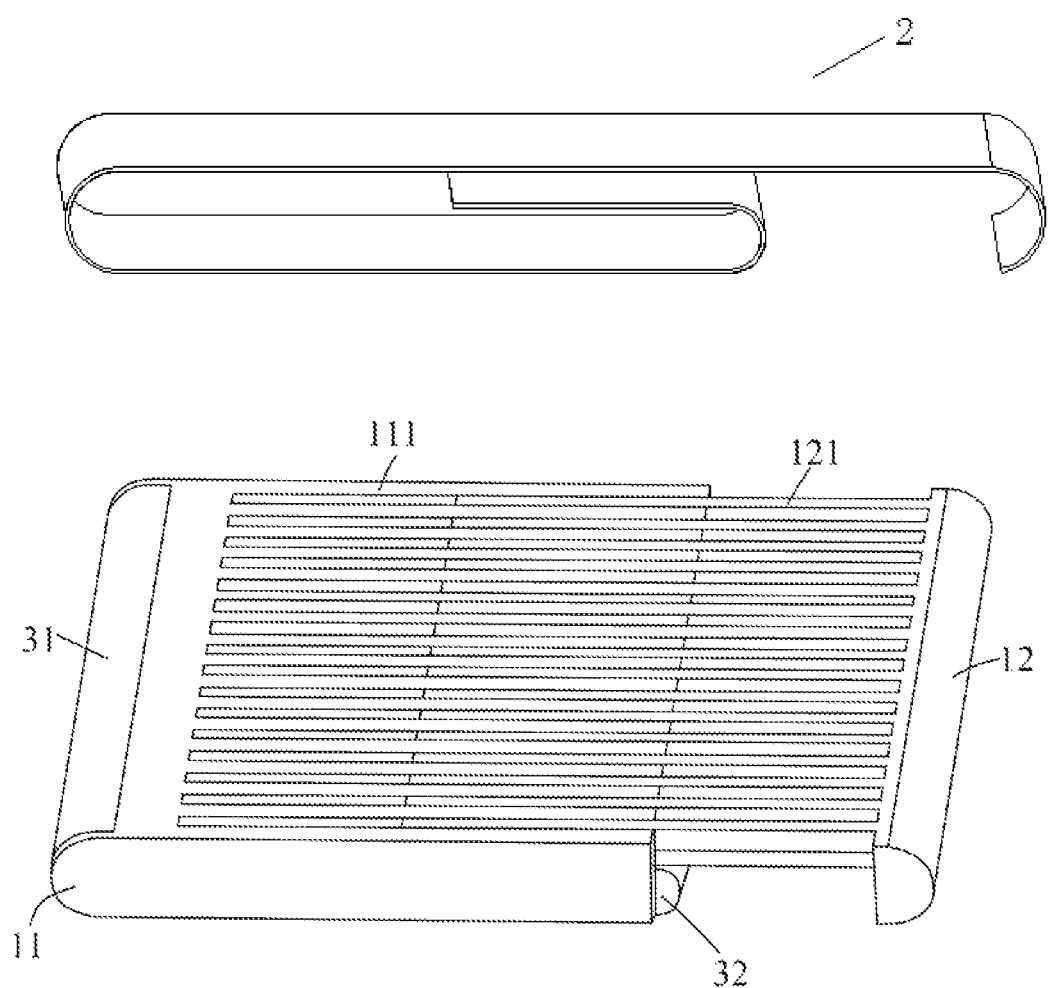
FIG. 6 is an exploded structural view showing the flexible display device in a transition state from the small display dimension state to a large display dimension state according to an embodiment of the invention.

FIG. 6 is an exploded structural view showing the flexible display device in a transition state from the small display dimension state to a large display dimension state according to an embodiment of the invention. With cross reference to FIG. 9, moving of the second case 12 relative to the first case 11 to the right drives a change in length of the flexible display device in a moving direction of the second case 12. That is, when the second case 12 moves in a direction away from the first case 11, the length of the flexible display device is increased in a moving direction of the second case 12, and the upper surface area of the flexible display device is also increased. During relative movement of the first case 11 and the second case 12, the pivoted assembly 3 drives the flexible display panel 2 to move, and thus to compensate the change in length of the flexible display device in the moving direction of the second case 12.

Specifically, the second case 12 when moving to the right pulls the flexible display panel 2 through the second fit position B. The second case 12 moving to the right drives the first wheel 31 and the second wheel 32 to rotate, a portion of the flexible display panel 2 corresponding to the first wheel 31 and a portion of the flexible display panel 2 corresponding to the lower surface of the case assembly 1 move to the upper surface of the case assembly 1, which pulls the extended part 20 of the flexible display panel 2 from the container cavity 4 to the outer surface of the case assembly 1.

During sliding of the flexible display device, the changing upper surface area of the flexible display device causes shortage of the flexible display panel 2 for covering vacancy on the upper surface of the flexible display device and oversupply of the flexible display panel 2 when the second case 12 moves to the left. Displacement of the extended part 20 from the container cavity during sliding of the flexible display device may offset such shortage and oversupply. The flexible display panel 2 are thus consistently matched with the changing dimension of the changing display area 21 on the upper surface of the flexible display device and are protected from forceful pulling by the flexible display device.

Figure 7:
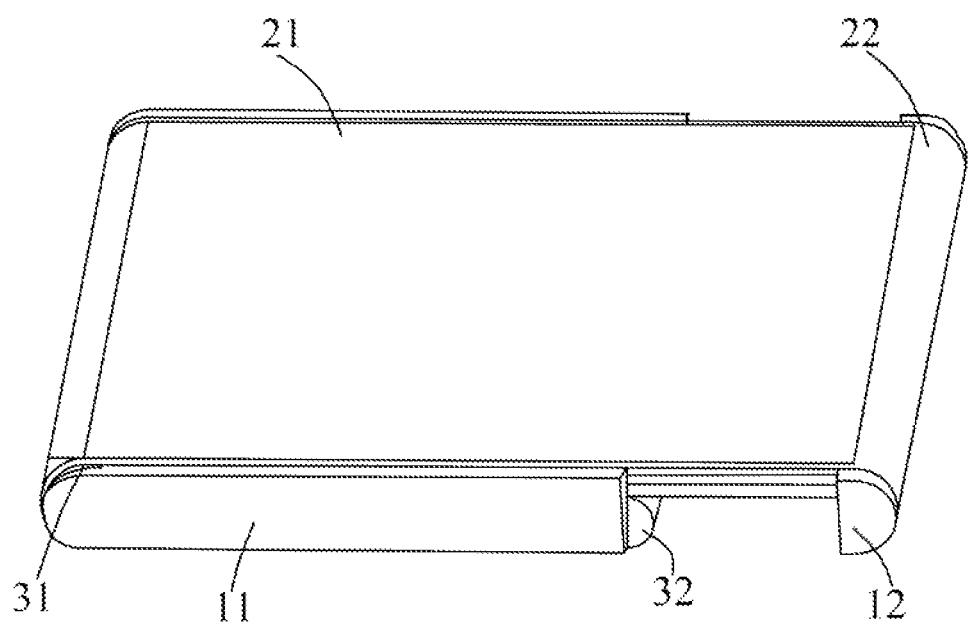
FIG. 7 is a schematic view showing a front structure of the flexible display device in a transition state from the small display dimension state to a large display dimension state according to an embodiment of the invention.
Figure 8:
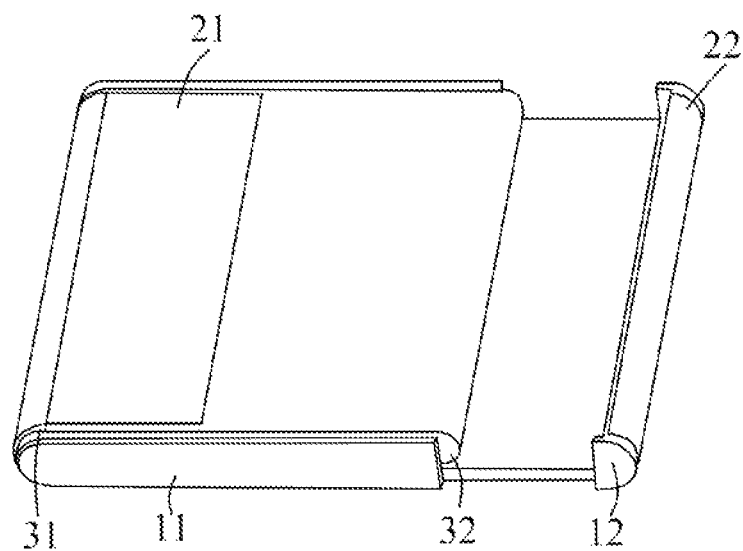
FIG. 8 is a schematic view showing a back structure of the flexible display device in a transition state from the small display dimension state to the large display dimension state according to an embodiment of the invention.

FIG. 7 and FIG. 8 are schematic views showing a front and back structure of the flexible display device in a transition state from the small display dimension state to a large display dimension state. The changing dimension of the flexible display device introduces dimension changes of the flexible display panel 2 on the upper surface of the flexible display device while a dimension of the flexible display panel 2 associated with the lower surface of the flexible display device remains unchanged. In the embodiment, the extended part 20 of the flexible display panel 2 being the non-display area 22 does not have display functionality. When the extended part 20 is pulled out, the display area 21 on the upper surface of the flexible display device is increased, the display area 21 on the lower surface of the flexible display device is decreased, the non-display area 22 associated with the extended part 20 is pulled out to the lower surface of the flexible display device.

In an alternative embodiment, the extended part 20 of the flexible display panel 2 has display functionality. When the display area 21 on the upper surface of the flexible display device is increased, the dimension of the display area 21 on the lower surface of the flexible display device is kept consistent. The flexible display device can thus be featured with dual-sided display functionality in the large display dimension state.

Figure 9:
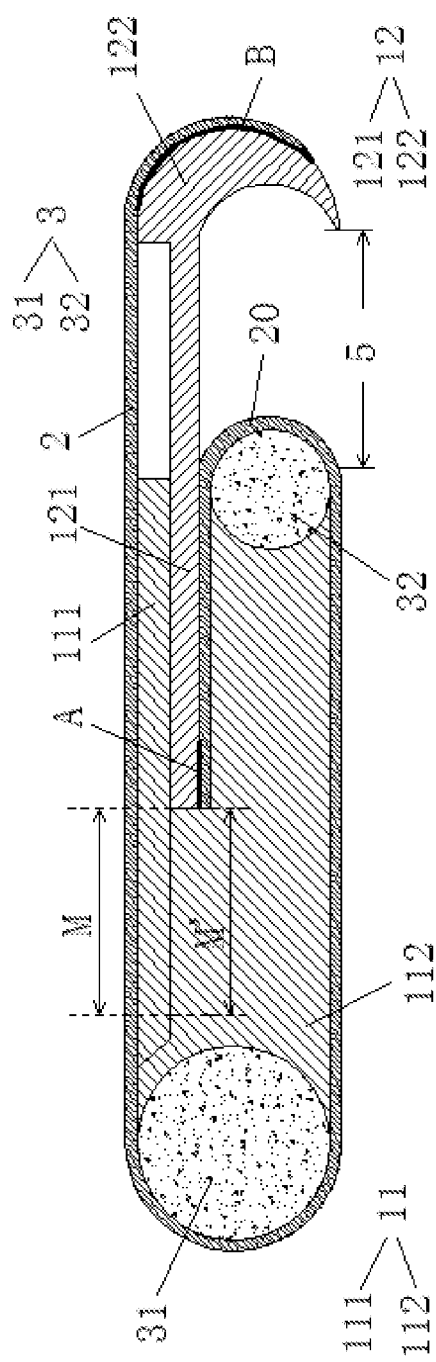
FIG. 9 is a cross sectional view showing the flexible display device in a transition state from the small display dimension state to the large display dimension state according to an embodiment of the invention.

FIG. 9 is a cross sectional view showing the flexible display device in a transition state from the small display dimension state to the large display dimension state. Width of the open channel 5 is greater than or equal to thickness of the flexible display panel 2. That is, width of the open channel 5 is increased when the second case 12 moves away from the first case 11, and decreased when the second case 12 moves toward the first case 11. To ensure that the flexible display panel 2 can move normally, the width of the open channel 5 is no less than thickness of the flexible display panel 2.

The change in length of the flexible display device in the moving direction of the second case 12 is equal to a change in length of extended part 20 through the open channel 5. Specifically, an dimensional increment M of the flexible display panel 2 on the upper surface of the flexible display device introduced by pulling the flexible display panel 2 out by displacement of the second case 12 is equal to an dimensional decrement M' of the flexible display panel 2 in the container cavity, or a dimensional change of the flexible display panel 2 being pulled out from the container cavity. That is, the moving second case 12 drives the increasing display area on the upper surface of the flexible display device, or increasing display area of the flexible display panel 2, outputs the offset portion of the display from the container cavity. The moving second case 12 facilitates mutual compensation between the changing outer surface area of the flexible display device and changing display area in the container cavity.

It can be appreciated that, during the flexible display device transits from the large display dimension state to the small display dimension state, the states of the flexible display device is similar to the description of FIG. 6 to FIG.

9. When the second case 12 moves toward the first case 11 in a returning direction, the length of the flexible display device decreases in the returning direction, the second case 12 pulls the flexible display panel 2 via the first fit position A and drives pivoted assembly 3 to rotate and to pull the extended part 20 of the flexible display panel 2 back into the container cavity 4 from the outer surface of the case assembly 1.

Figure 10:
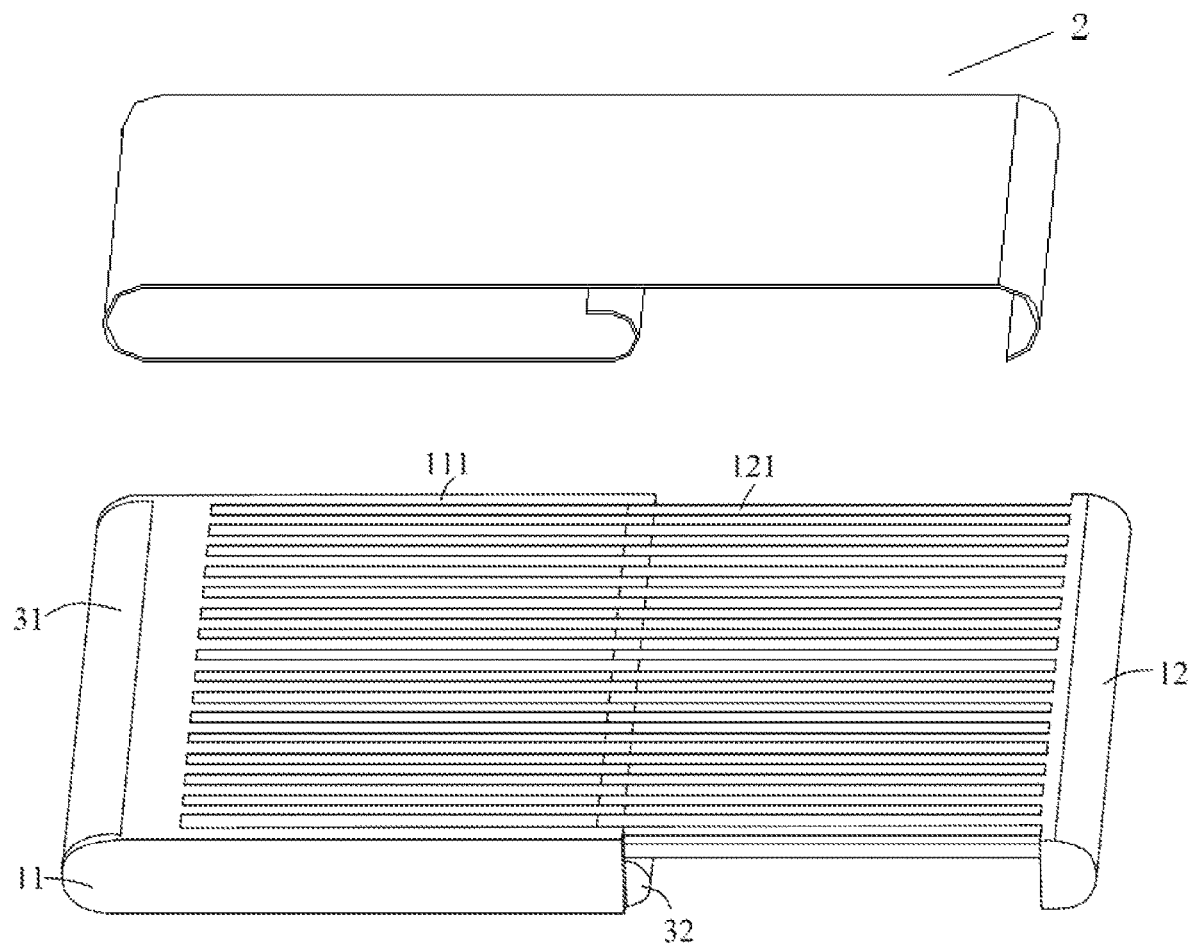
FIG. 10 is an exploded structural view showing the flexible display device in the large display dimension state according to an embodiment of the invention.

FIG. 10 is an exploded structural view showing the flexible display device in the large display dimension state according to an embodiment of the invention. When the second case 12 slides to the most right end of the chute formed from the first compensation structure 111 and the second compensation structure 121, the dimension of the flexible display device is maximized. In the state, the tooth tips of the first compensation structure 111 meet the tooth tips of the second compensation structure 121, the second case 12 reaches the maximum moving extent relative to the first case 11, and the dimension of the flexible display panel 2 on the upper surface of the flexible display device is maximized to realize a large display.

Figure 11:
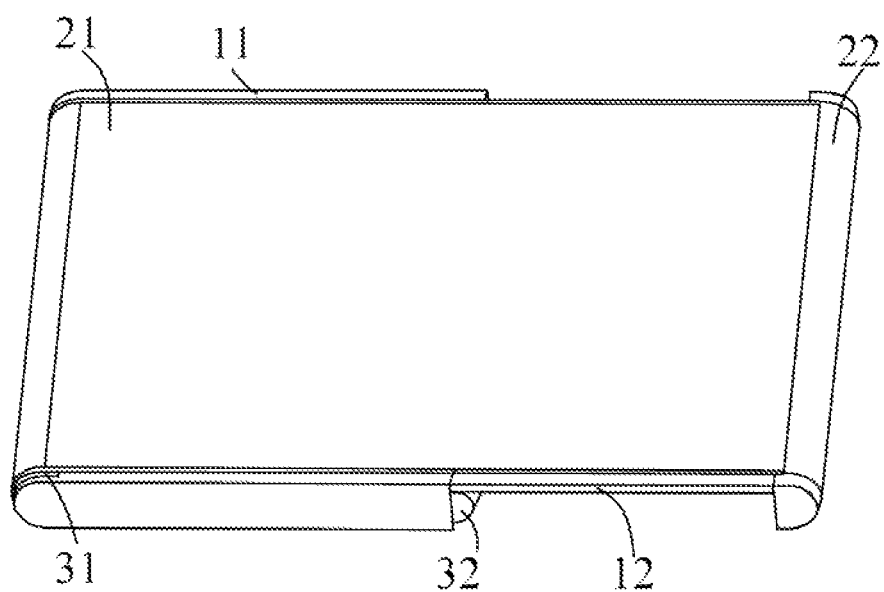
FIG. 11 is a front structural view showing the flexible display device in the large display dimension state according to an embodiment of the invention.
Figure 12:
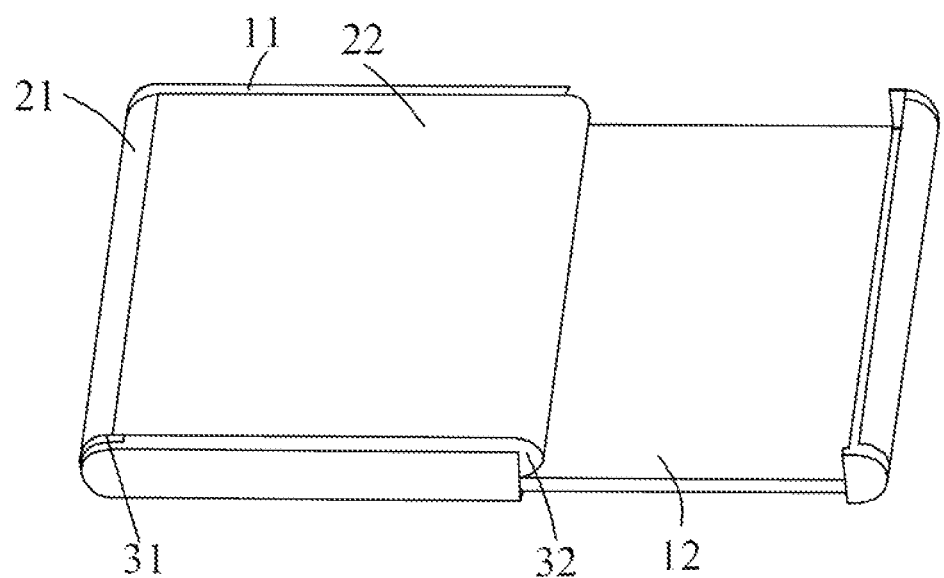
FIG. 12 is a back structural view showing the flexible display device in the large display dimension state according to an embodiment of the invention.

FIGS. 11-12 are front and back structural views showing the flexible display device in the large display dimension state. The entire display area 21 of the flexible display panel 2 is scrolled to the upper surface of the flexible display device, and the non-display area 22 is located on the lower surface of the flexible display device. The disclosure is not limited to the example. If the extended part 20 has display functionality, the flexible display device may have both small and large display functions.

Figure 13:
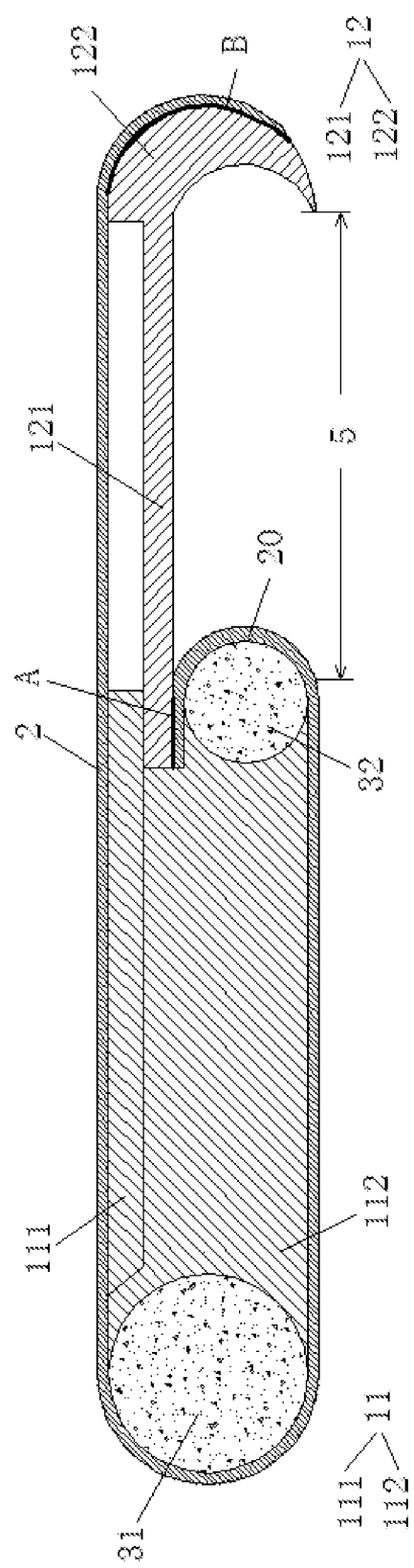
FIG. 13 is a cross sectional view showing the flexible display device in the large display dimension state according to an embodiment of the invention.

FIG. 13 is a cross sectional view showing the flexible display device in the large display dimension state. Width of the open channel 5 is maximized in the state. The extended part 20 does not contact with the rest of the second case 12 except the fit position of second case 12 while having a portion in contact with the second wheel 32, and another portion being extended to an outer surface of the flexible display device. The dimension of the flexible display device is maximized in the state.

In the embodiment, the first compensation structure 111 and the second compensation structure 121 have limiting stoppers (not shown) for limiting a moving range of the second case 12 relative to the first case 11. For example, the limiting stoppers comprise a sliding chute on a contact surface between the first compensation structure 111 and the second compensation structure 121, and a slider located on the second compensation structure 121 that matches the sliding chute. The chute extends along a moving direction of the second case 12 and ends at tooth tips of the first compensation structure 111. The slider is embedded in the chute. The limiting stopper is not limited to the example.

In the embodiment, the flexible display device has a latch (not shown) which is open when the second case 12 moves relative to the first case 11, and is close after the second case 12 moves relative to the first case 11 for a predetermined distance.

In the embodiment, the moving direction of the relative movement between the first case 11 and the second case 12 is a direction in which the first compensation structure 111 and the second compensation structure 121 extend.

The invention provides a flexible display device using a flexible display panel equipped with a movable case assembly to form a display device with adjustable panel dimensions. The flexible display device has a small display dimension state, a large display dimension state, and a middle display dimension state, and can transit to and stay in an arbitrary intermediate transition state among the states. An outer surface of the flexible display device is complementary to the panel dimension change in an inner container cavity via case sliding, which can prevent the flexible display panel from being pulled and damaged by the flexible display device during dimensional change of the front display panel.

To sum up, the present invention has been described with preferred embodiments thereof and it is understood that many changes and modifications to the described embodiment can be carried out by a person with ordinary skills in the art without departing from the scope and the spirit of the invention that is intended to be limited only by the appended claims.

What is claimed is:

1. A flexible display device comprising:
a first case and a second case which are opposite to each other, wherein the first case and the second case cooperatively form a case assembly for containing a flexible display panel, a container cavity formed between the first case and the second case, and the first case and the second case are configured to form an open channel on a side surface of the case assembly, wherein the first case and the second case are respectively configured to form a mutually complementary first compensation structure and second compensation structure corresponding to another side surface of the case assembly, and the first compensation structure of the first case and the second compensation structure of the second case complementarily fill gaps of each other to allow relative movement of the first case and the second case; and
a pivoted assembly located on two sides of the first case, wherein the flexible display panel extends from one end of the open channel which is away from the pivoted assembly around a surface of the case assembly and the pivoted assembly, and enters into the container cavity through another end of the open channel;
wherein the flexible display panel further comprises an extended part located in the container cavity, wherein moving of the second case relative to the first case drives a change in length of the flexible display device in a moving direction of the second case, the pivoted assembly drives the flexible display panel to move to compensate the change in length of the flexible display device in the moving direction of the second case, and the change in length of the flexible display device in the moving direction of the second case is equal to a change in length of extended part through the open channel;
wherein the pivoted assembly comprises a first wheel and a second wheel which have an axial direction perpendicular to a moving direction of the first case and the second case, the first wheel is located on an end of the first case away from the second case, the second wheel is located on an end of the first case close to the second case, and a diameter of the first wheel is less than or equal to thickness of the case assembly;
wherein the first case comprises a first case main body and the first compensation structure, and an end of the first compensation structure away from the second case is connected with the first case main body, a gap is formed between a remaining portion of the first compensation structure and the first case main body;
wherein the second case comprises a second case main body and the second compensation structure, an end of the second compensation structure away from the first case is connected with the second case main body, and the second wheel is located between the second case main body and the first case main body; and wherein a portion of the first wheel is embedded into an end of the first case main body, a remaining portion of the first wheel is exposed on a surface of the first case main body in contact with the flexible display panel, a portion of the second wheel is embedded into another end of the first case main body, a remaining portion of the second wheel is exposed on the surface of the first case main body in contact with the flexible display panel;

wherein the case assembly and the pivoted assembly are enclosed by the flexible display panel.

2. The flexible display device of claim 1, wherein both of the first compensation structure and the second compensation structure are tooth shaped with a same tooth pitch and interlaced to fill the gaps of each other.

3. The flexible display device of claim 1, wherein a diameter of the second wheel is less than the diameter of the first wheel.

4. The flexible display device of claim 3, wherein a gap is formed between a remaining portion of the first compensation structure and the first case main body;

wherein a gap is formed between the first case main body and a remaining portion of the second compensation structure.

5. The flexible display device of claim 4, wherein the container cavity is formed from the gap formed between the first compensation structure and the first case main body, the gap formed between the second compensation structure and the first case main body, and the gap formed between the second wheel and the second case main body, an end of the flexible display panel having the extended part is affixed to an end of the second compensation structure closing to first wheel through a first fit position, another end of the flexible display panel is affixed to a side surface of the second case main body, which is away from the second wheel, through a second fit position.

6. The flexible display device of claim 5, wherein thickness of the second compensation structure is greater than thickness of the first compensation structure.

7. The flexible display device of claim 5, wherein when the second case moves away from the first case in a moving direction, a length of the flexible display device increases in the moving direction, the second case pulls the flexible display panel via the second fit position and drives pivoted assembly to rotate and to pull the extended part of the flexible display panel from the container cavity to an outer surface of the case assembly.

8. The flexible display device of claim 5, wherein when the second case moves toward the first case in a returning direction, the length of the flexible display device decreases in the returning direction, the second case pulls the flexible display panel via the first fit position and drives pivoted assembly to rotate and to pull the extended part of the flexible display panel back into the container cavity from the outer surface of the case assembly.

9. The flexible display device of claim 5, wherein a portion of the extended part which is not belonging to a portion of the extended part corresponding to the first fit position is in contact with the case assembly.

10. The flexible display device of claim 1, wherein a supporting layer is located on a side surface of the flexible display panel which is in contact with the pivoted assembly.

11. The flexible display device of claim 1, wherein the moving direction in which the second case moves relative to the first case is a direction in which the first compensation structure and the second compensation structure extend.

12. The flexible display device of claim 1, wherein the first compensation structure and the second compensation structure have limiting stoppers for limiting a moving range of the second case relative to the first case.

13. The flexible display device of claim 1, wherein width of the open channel is greater than or equal to thickness of the flexible display panel, and is increased when the second case moves away from the first case, and decreased when the second case moves toward the first case.

14. The flexible display device of claim 1, wherein an end of the flexible display panel having the extended part is affixed to an end of the second compensation structure closing to first wheel through a first fit position, another end of the flexible display panel is affixed to a side surface of the second case main body, which is away from the second wheel, through a second fit position, and the extended part has display functionality.

15. The flexible display device of claim 1, wherein an end of the flexible display panel having the extended part is affixed to an end of the second compensation structure closing to first wheel through a first fit position, another end of the flexible display panel is affixed to a side surface of the second case main body, which is away from the second wheel, through a second fit position, and the extended part is a non-display area.

* * * * *